United States Patent
McGloin et al.

(10) Patent No.: US 7,050,039 B1
(45) Date of Patent: May 23, 2006

(54) ARRANGEMENTS ENABLING AN AUDIENCE TO REPLAY A PRESENTATION

(75) Inventors: Ciaran McGloin, Dublin (IE); Reto Stamm, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 938 days.

(21) Appl. No.: 09/874,627

(22) Filed: Jun. 4, 2001

Related U.S. Application Data

(63) Continuation-in-part of application No. 09/617,593, filed on Jul. 18, 2000.

(51) Int. Cl.
*G09G 3/38* (2006.01)
*G09G 3/34* (2006.01)

(52) U.S. Cl. .................. 345/105; 345/106; 345/107

(58) Field of Classification Search ........ 345/104–108, 345/156–169; 379/90, 96, 98, 93.01–93.09, 379/93.17–93.24
See application file for complete search history.

(56) References Cited

U.S. PATENT DOCUMENTS

| | | | |
|---|---|---|---|
| 5,685,568 A | | 11/1997 | Pirrello |
| 5,764,736 A | * | 6/1998 | Shachar et al. .......... 379/93.09 |
| 5,838,889 A | * | 11/1998 | Booker ....................... 345/649 |
| 5,852,807 A | | 12/1998 | Skarbo et al. |
| 6,084,951 A | * | 7/2000 | Smith et al. ............. 379/93.17 |
| 6,192,117 B1 | | 2/2001 | Stephan |
| 6,226,367 B1 | * | 5/2001 | Smith et al. ........... 379/142.04 |
| 6,239,774 B1 | * | 5/2001 | Altman ........................ 345/31 |
| 6,572,149 B1 | | 6/2003 | Long |
| 6,650,761 B1 | | 11/2003 | Rodriguez et al. |
| 2005/0103838 A1 | * | 5/2005 | Slotkin et al. .............. 235/380 |
| 2005/0116026 A1 | * | 6/2005 | Burger et al. ............... 235/380 |

OTHER PUBLICATIONS

Mucciolo et al.; "Microsoft PowerPoint 2000"; May 1999; Que Co.; 2000 Special Edition; pp. 40, 124, 178-183, 252-255 and 737-738.

* cited by examiner

*Primary Examiner*—Vijay Shankar
(74) *Attorney, Agent, or Firm*—Michael R. Casey; Lois D. Cartier

(57) ABSTRACT

An electronic business card has a memory storing presentation slide images, a display that displays the images, and a processing device that governs the display process. The card has input devices (pads or buttons such as FORWARD, BACK and INDEX) allowing the user to control the display. The display's picture elements are preferably implemented as multi-chromic beads whose respective physical orientations are controlled by the processing device so as to form the viewed image. A method requires a target audience member to view at least one "payload" image (information that a presenter desires to propagate among a target audience), in association with at least one "hook" image (a quiz or game), on an electronic business card, PDA, or PC. The method includes presenting the payload image in association with the hook image, receiving and analyzing a user response, and displaying a reward image if the user response satisfies a criterion.

4 Claims, 17 Drawing Sheets

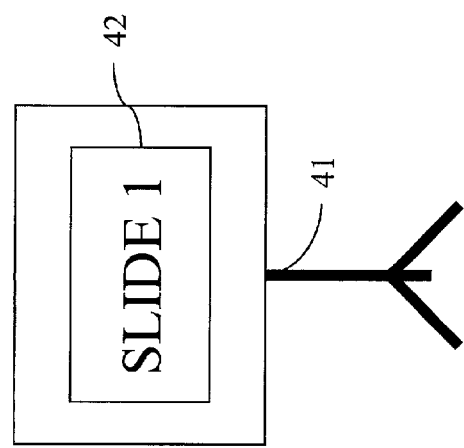
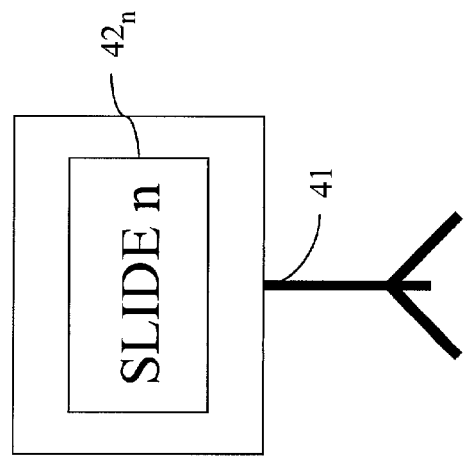
Figure 4A
Figure 4B
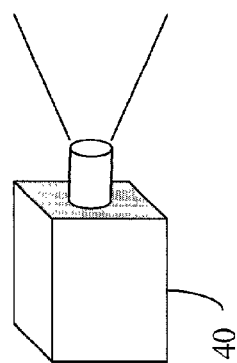
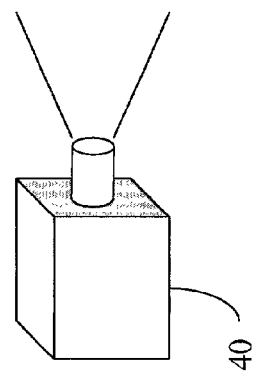

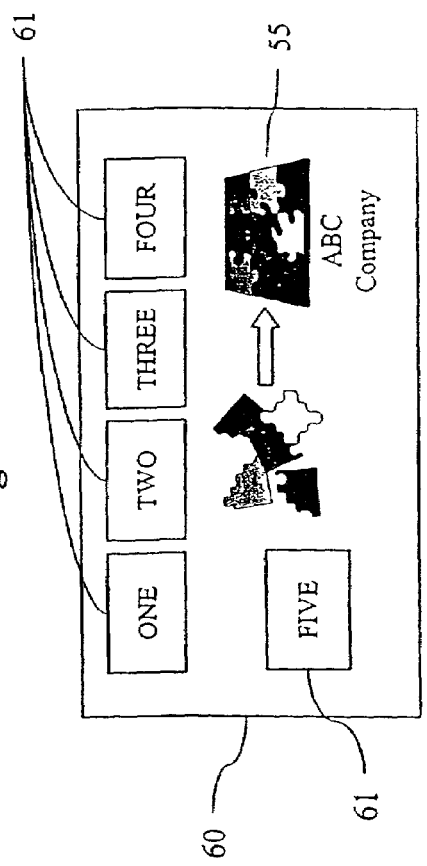
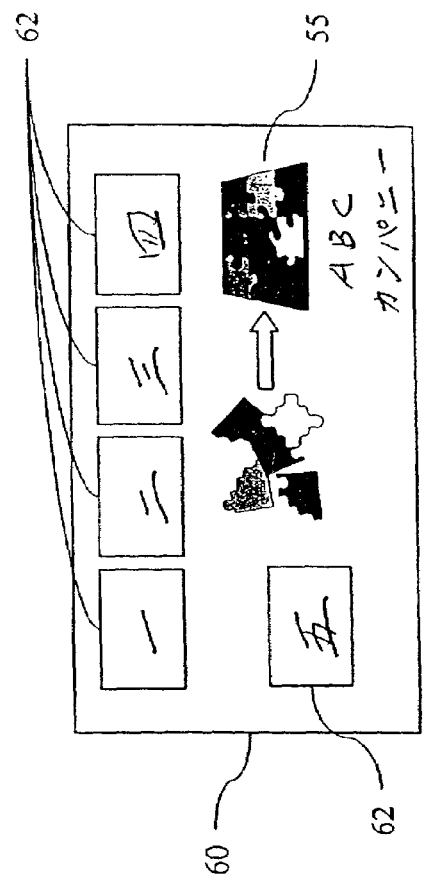

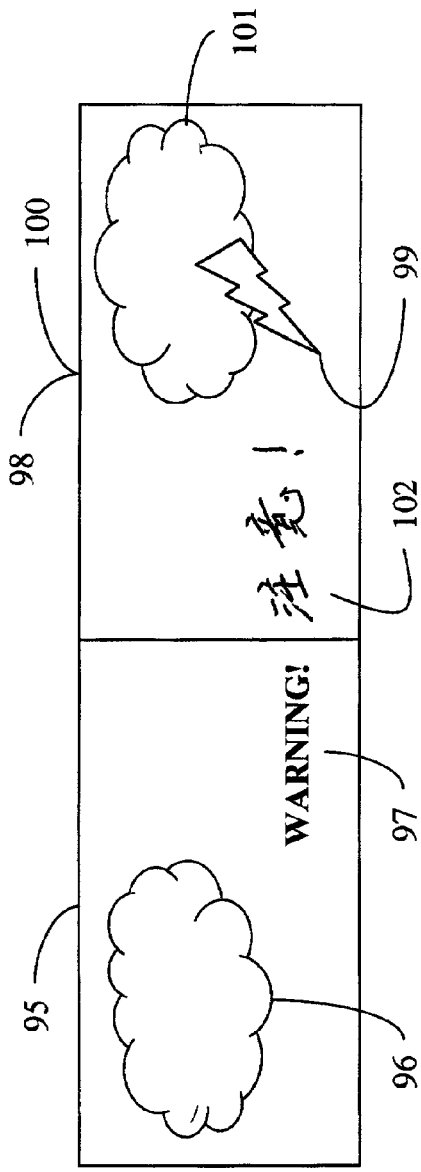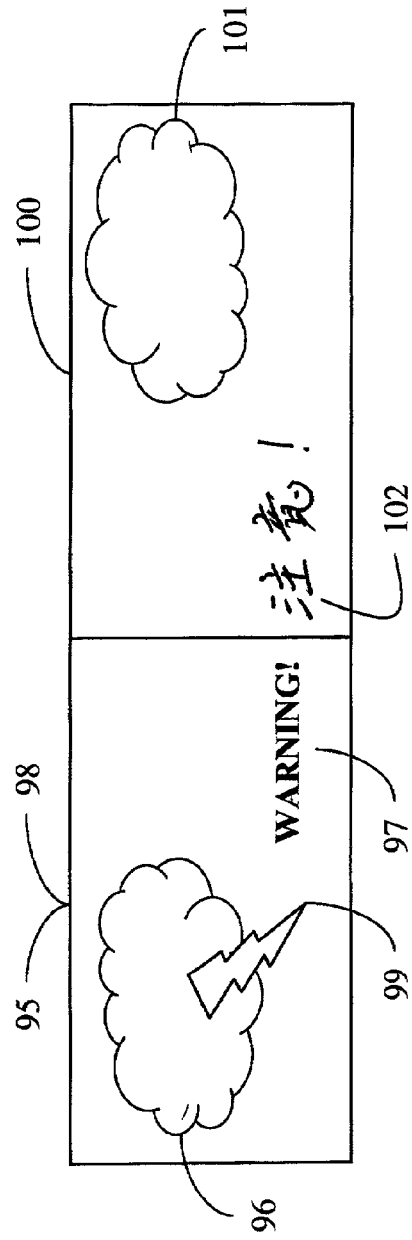

ARRANGEMENTS ENABLING AN AUDIENCE TO REPLAY A PRESENTATION

This is a continuation-in-part of application Ser. No. 09/617,593, filed Jul. 18, 2000.

FIELD OF THE INVENTION

The present invention is directed to methods, systems, computer-readable memories, and computer program products for enhancing audience exposure to a presentation and more particularly, methods, systems, computer-readable memories and computer program products for providing a miniature version of a presentation that entices the audience to later review the presentation and propagate the presentation to other members of a target audience.

BACKGROUND OF THE INVENTION

A common approach for conveying information such as marketing information, technical information, or other business information is through a live presentation to an audience. Such a presentation commonly takes the form of briefing slides containing bullets highlighting the key points of the message being presented. Printed versions of the presentation are commonly made available to the audience for future reference. If the presentation is made at a conference or at a trade show, it is not uncommon for the attendees to have accumulated hundreds or thousands of pages of presentation materials.

Many presentations are made for marketing reasons, and the presentation materials left with the audience are relied on to generate business leads. Since the practice of giving the audience printed copies of briefing materials has become so common, it is difficult to prevent the audience members from simply throwing away the materials that are being relied on to generate business contacts.

SUMMARY OF THE INVENTION

Commercially available presentation software such as Microsoft's POWERPOINT have the ability to print presentation materials in various formats such as, for example, three briefing slides per page. Other commercially available products such as CD-ROM CARDs by CDcard Corporation provide business card sized CD-ROMs on which marketing materials may be placed.

The present inventors have recognized that a limitation with conventional approaches to conveying a message to an audience is that the conventional approach of leaving a printed version of the briefing materials with the audience does not sufficiently entice the target audience to refer back to the materials at a later date. The present inventors also recognized that other conventional approaches for conveying a message to a target audience such as creating printed advertisements suffer from not being able to include the level of detail that can be included in a briefing slide format.

The present inventors have recognized, however, that a limitation with known products is that they either facilitate re-looks by the audience, or contain information in briefing format, but not both.

A challenge, then, as presently recognized, is to develop an approach to increase the life span of printed briefing materials, by providing them in such a way so as to facilitate re-looks by the targeted audience and to convey the intended message, without having the appearance of an advertisement.

The present inventors have recognized that by repackaging presentation briefing materials into a different handout format, those handouts will be less likely to be thrown away by the targeted audience and will be distinguished from other presentation handouts. Accordingly, one object of the present invention is to present presentation briefing materials as a miniature presentation that can be given to the targeted audience.

The present inventors have also recognized that in order to facilitate the conveyance of a message to a targeted audience, it is necessary to increase the number of times a particular presentation is looked at by that audience.

Accordingly, a further object of the present invention is to present presentation materials as a miniature presentation in a way that will increase the life span of the briefing with the targeted audience. In one embodiment, the presentation briefing materials are reproduced in miniature on the reverse side of a business card. In another embodiment, the presentation briefing materials are packaged as a miniature deck including a frame by frame animation that can be played back by flipping through the deck.

The present inventors have also recognized that it is important to maintain the briefing format of the materials, as compared to presenting the materials as an advertisement. Accordingly, a further object of the present invention is to provide a miniature version of a presentation briefing to the targeted audience while maintaining the level of detail contained in the presentation briefing.

To address at least one of the above-described objects, anyone of a method, a computer-based system, and a computer program product can create a presentation briefing as a miniature presentation that facilitates re-looks by the targeted audience and maintains the level of detail contained in the briefing materials used at a live presentation.

In one embodiment of the present invention, presentation briefing materials are created, a miniature printed version of the presentation materials is created, and the presentation materials are presented to a target audience. The target audience also is provided with the miniature printed version of the presentation materials either before or after the presentation materials are presented to a target audience.

The miniature printed version of the presentation materials may be created in a variety of formats. The objective in formatting the miniature printed version is to facilitate the conveyance of the message intended for the targeted audience, and to increase the likelihood that the printed presentation materials will be retained by the targeted audience, thereby facilitating relooks by the targeted audience.

In still another embodiment of the present invention, a memory in an electronic business card stores a presentation for later review. The electronic business card may also contain identifying, contact or promotional information printed thereon.

In accordance with still another embodiment of the present invention, a presentation may be downloaded to the personal digital assistants (PDAs) of the attendees of the presentation. The attendees could later view the presentation (1) on their PDAS, (2) on a personal computer to which the downloaded presentation has been transferred, or (3) on the PDA of still another user who has received the presentation from another PDA. Preferably, the presentation materials are intermingled with items designed to be of interest to the audience, such as quizzes or games, so that in order to find the correct answer to quizzes or to successfully play the games, the user must view corresponding portions of the presentation.

Articles of manufacture, such as memories with computer-readable code that can be executed to perform the methods described herein, are also possible.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein:

FIGS. 4A–4B are schematic diagrams depicting a presentation made to an audience using a projector and a screen;

FIGS. 6A–6B are views of exemplary single page bilingual miniature presentations;

FIGS. 9A–9D are views of exemplary miniature presentations using a transparent sheet for emphasis.

DETAILED DESCRIPTION OF THE DRAWINGS

Figure 1:
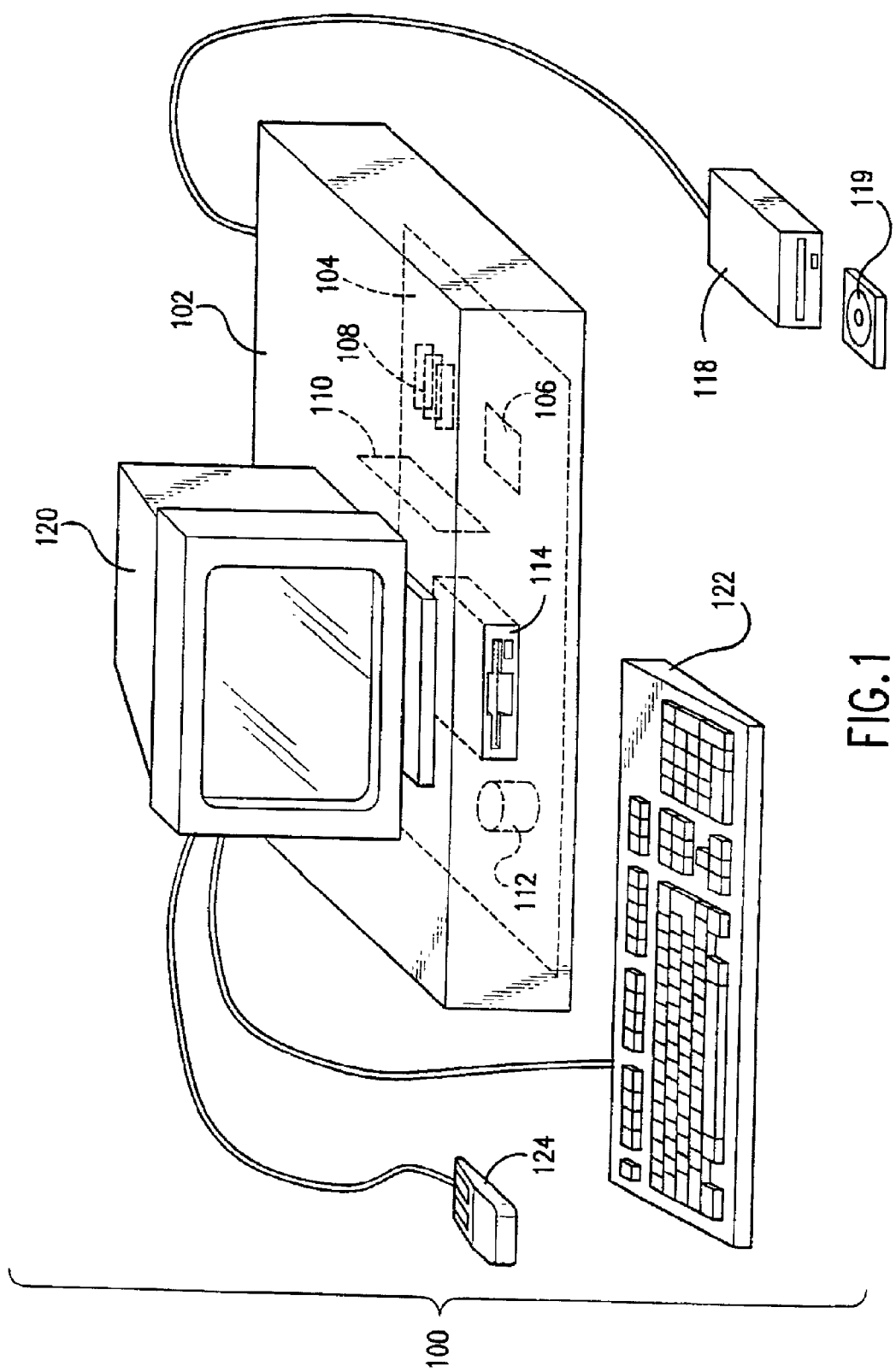
FIG. 1 is a schematic diagram of an electronics portion of the workstations used in the system.

Referring now to the drawings, wherein like reference numerals designate identical or corresponding parts throughout the several views, FIG. 1 is a schematic illustration of a computer system for producing miniature presentations. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or an Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies. In addition, a printer 22 in FIG. 2 prints the miniature presentations in the desired format.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for producing miniature presentations. The computer code devices of the present invention can be any interpreted or executable code mechanism, including but not limited to scripts, interpreters, dynamic link libraries, Java classes, and complete executable programs. Network adapters can likewise be treated as computer readable media by reading/receiving computer code devices from remote storage locations.

Figure 2:
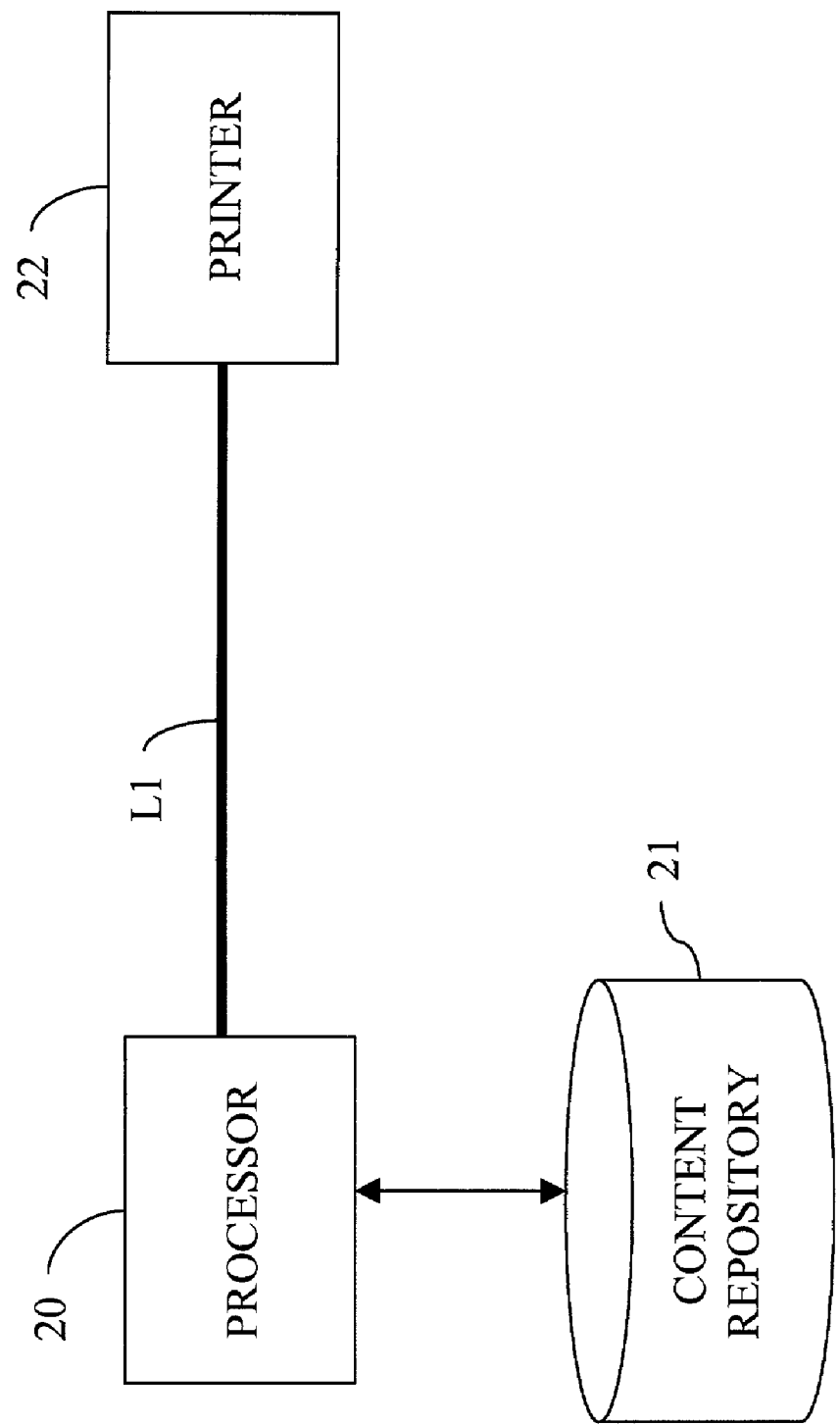
FIG. 2 is a block diagram showing an overall system configuration for one embodiment of the present invention.

As shown in FIG. 2, the system of the present invention includes a processor, a content repository 21, a printer, and a network L1. In one embodiment, the content repository contains all presentation briefing materials, as well as other marketing information that may be included in a miniature presentation. The information contained in the content repository 21 is maintained by processes on the processor 20. The processor 20 interacts with the content repository 21 through various software applications. Commercially available software applications (e.g., POWERPOINT by Microsoft Corporation) may be used to create presentation briefing materials that are stored in the content repository 21. Other software products are used by the processor 20 to manipulate and reformat information contained in the content repository 21 to produce miniature presentations. The processor 20 may use not only presentation briefing materials maintained in the content repository 21, but also other marketing materials maintained in the content repository 21 to produce the miniature presentation.

The content repository 21 may reside on a storage device of the processor 20, or reside on another device accessible by the processor 20 by way of a local area network L1 or other communications link (e.g., a virtual private network, a wireless link, or an Internet-enabled link). The system also includes a printer 22, or other output devices for use in creating miniature printed versions of presentation briefing materials. The processor 20 is connected to the printer 22 either directly, (e.g., by a serial or parallel cable), by way of a local area network L1, or via another communications link (e.g., a virtual private network, wireless link, or Internet-enabled link).

Figure 3:
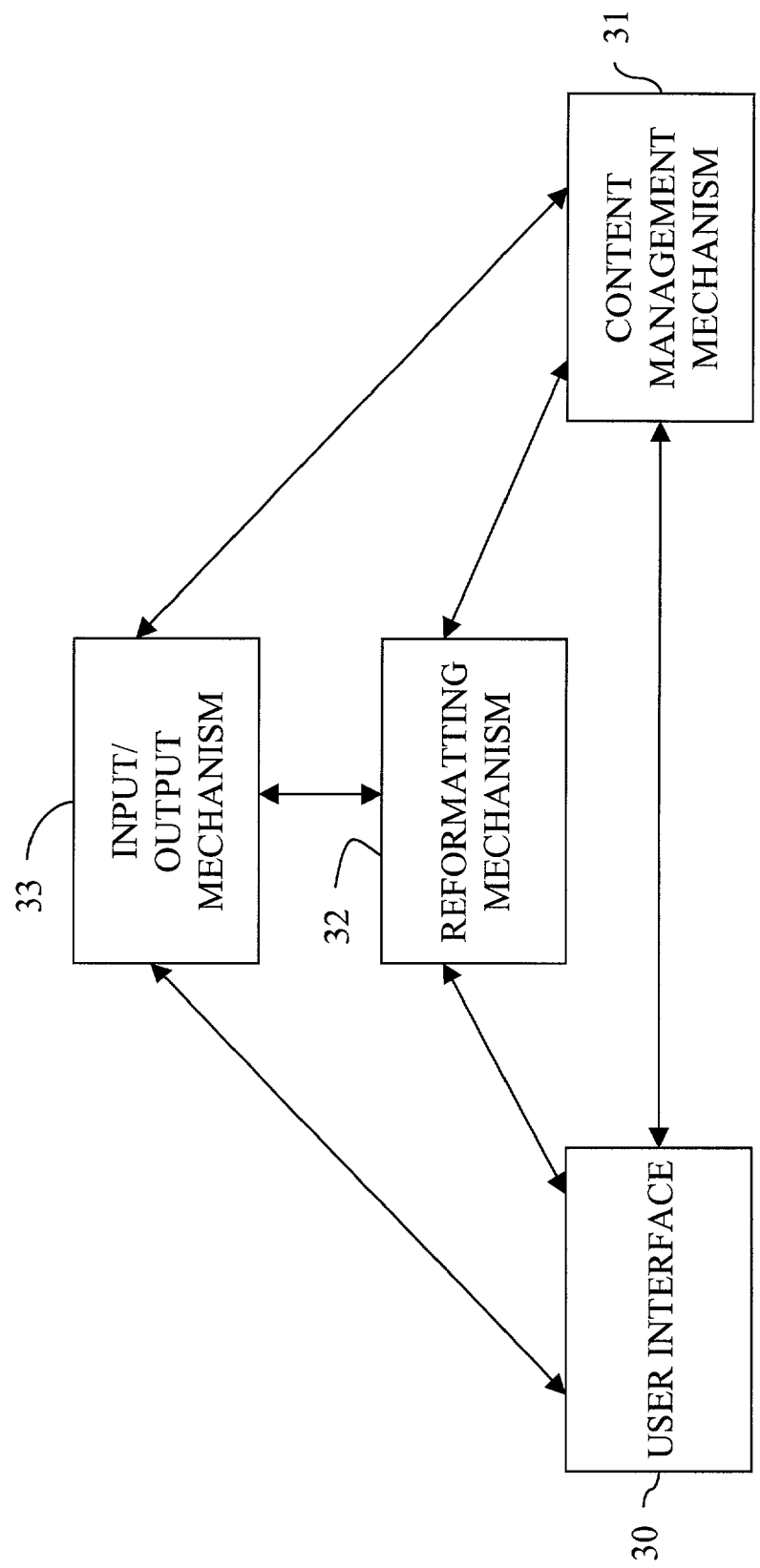
FIG. 3 is a block diagram showing control mechanisms used with the processor shown in FIG. 2.

FIG. 3 shows the mechanisms implemented by the processor 20 in greater detail. The user of the system interacts with the processor 20 through the user interface 30. The user interface 30 presents information to, and receives information from, the user of the system and provides that information to the content management mechanism 31 and the reformatting mechanism 32, both of which may manipulate information from the content repository 21 to create products that will be output to the printer 22, or other output device, via the input/output mechanism 33. The content management mechanism 31 provides a mechanism through which presentation briefing materials and other marketing information may be maintained in the content repository 21.

The reformatting mechanism 32 provides a mechanism through which the processor 20 may reformat presentation briefing materials, other marketing materials, or other information maintained in the content repository 21 into a miniature printable version of a presentation briefing that may be printed on the printer 22, or other output device. The input/output mechanism 33 provides a mechanism through which the user interface 30, the content management mechanism 31, and the reformatting mechanism 32 can interact with external components. For example, the input/output mechanism 33 allows the processor 20 to connect to the network L1 through a remote connection. Also, the input/output mechanism 33 provides a mechanism through which the processor 20 can communicate with the printer 22.

FIGS. 4A and 4B illustrate a conventional live presentation using presentation briefing materials. As shown in FIG. 4A, a projector 40 is used to project presentation briefing materials on a surface visible to the audience, for example, a screen 41. As would be appreciated from the numbering scheme used, "n" slides are presented to the live audience, as indicated by the first slide 42, entitled "SLIDE 1", and shown in FIG. 4A, and the last slide 42n entitled "SLIDE n," and shown in FIG. 4B. Each of the individual slides 42, ... 42n contain information pertinent to the message being conveyed by the presenter to the live audience. A miniature printed version of the presentation briefing materials (i.e., the information contained in "SLIDES 42, ... 42n) is provided to the audience for them to keep.

FIGS. 5A–5D illustrate exemplary approaches to creating a miniature presentation.

Figure 5A:
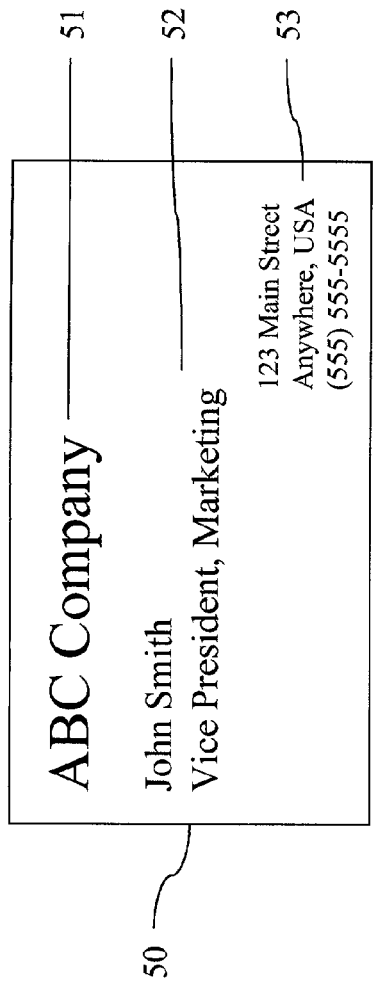
FIGS. 5A–5D are views of exemplary single page miniature presentations.
Figure 5B:
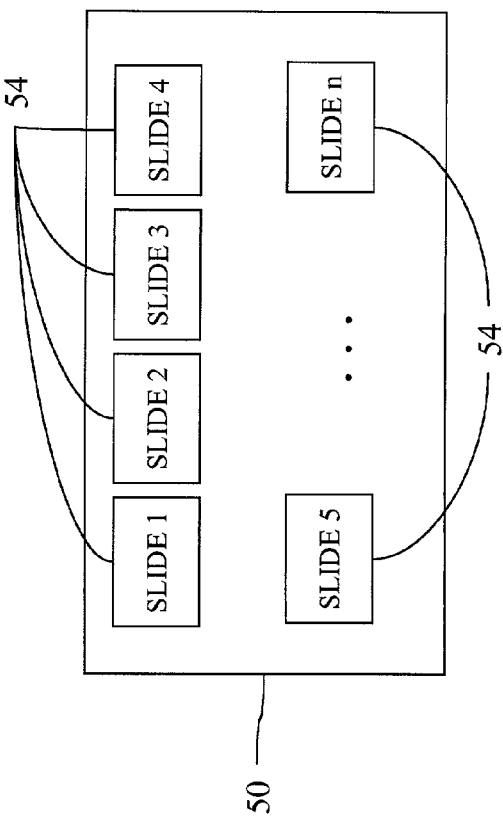
Figure 5C:
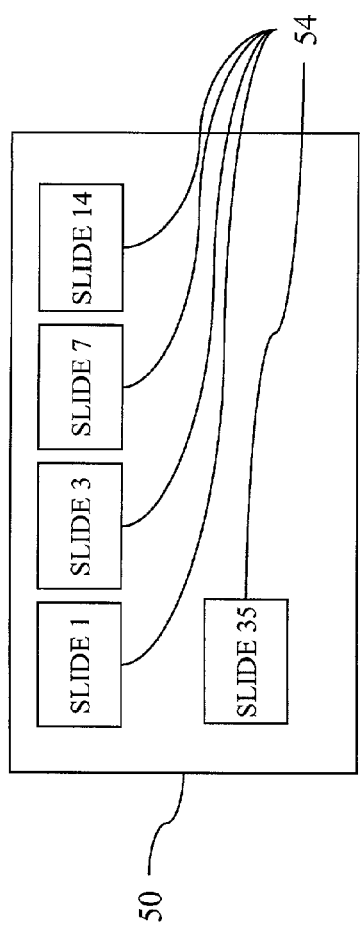
Figure 5D:
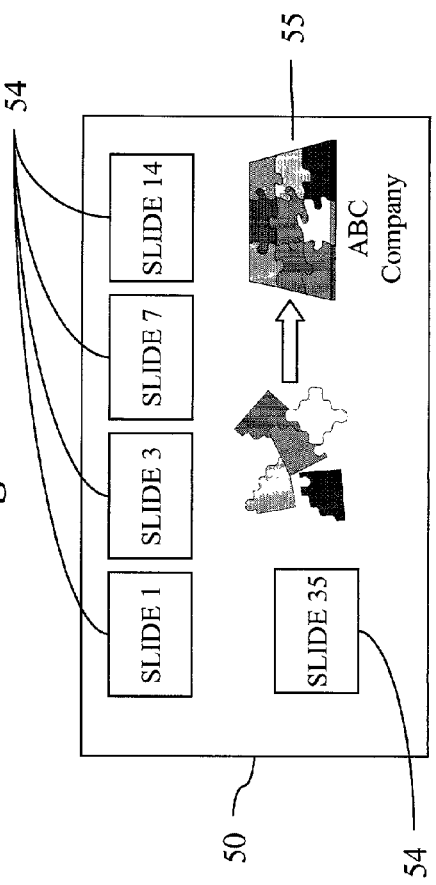

In each of the embodiments of FIGS. 5B–5D, the presentation briefing materials are reproduced on the reverse side of a standard business card 50 (e.g., containing a company name 51, the name and title of a contact within the company 52, and the address and telephone number of the contact at the company 53) as shown in FIG. 5A. In the embodiment of FIG. 5B, each of the individual slides 54 of the presentation briefing given to the live audience are reproduced in miniature on the reverse side of the business card 50. Alternatively, as shown in FIG. 5C, a subset of the individual slides 54 used in the live presentation may be reproduced in miniature on the reverse side of the business card 50.

As shown in FIG. 5D, an alternate embodiment combines (1) a miniaturized subset of the individual slides 54 used in the live presentation and (2) other marketing materials that will facilitate the conveyance of the message contained in the presentation. For example, an image 55 is included on the reverse side of the business card 50 that is intended to refresh the memory of the audience member as to the message contained in the live presentation.

FIGS. 6A and 6B illustrate another exemplary approach to creating a miniature printed version of a presentation. As shown in FIGS. 6A and 6B, a miniature two-sided, bilingual handout 60 may be created and distributed to the live presentation audience. The two-sided handout 60 may be the size of a standard business card 50, or any other size that would increase the likelihood that the audience members would retain the handout. By presenting the materials in two languages (e.g., English and Japanese on opposite sides as shown in FIGS. 6A and 6B respectively, the message from the live presentation can be conveyed to audience members using two different languages. This increases the exposure of the message to the audience members. As discussed above, the two-sided bilingual miniature presentation may include an image 55 intended to refresh the memory of the audience members as to the message of the live presentation.

By presenting the miniature presentation on the back of a business card 50, as discussed above, or on a two-sided bilingual handout 60, also discussed above, the likelihood that the handout will be retained by the audience members is enhanced. By increasing the likelihood that the handout will be retained, the objectives of the live presentation may be furthered by increasing the likelihood that the message, through the miniature presentation handout 50, 60 will get more re-looks than the conventional approach of conveying a message (i.e., handing out printed copies of the presentation briefing materials).

Figure 7A:
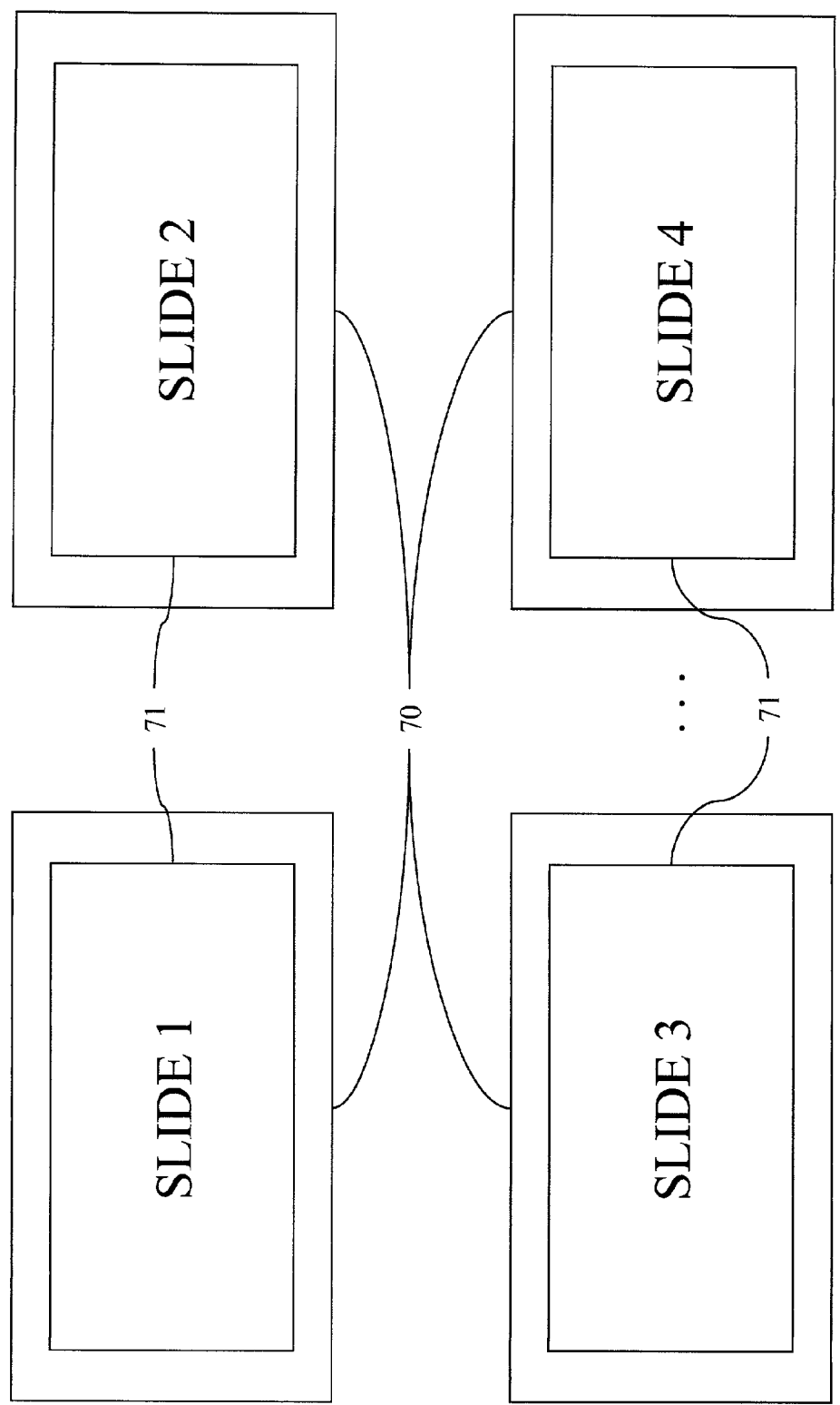
FIGS. 7A–7D are views of an exemplary multi-page miniature presentation.
Figure 7B:
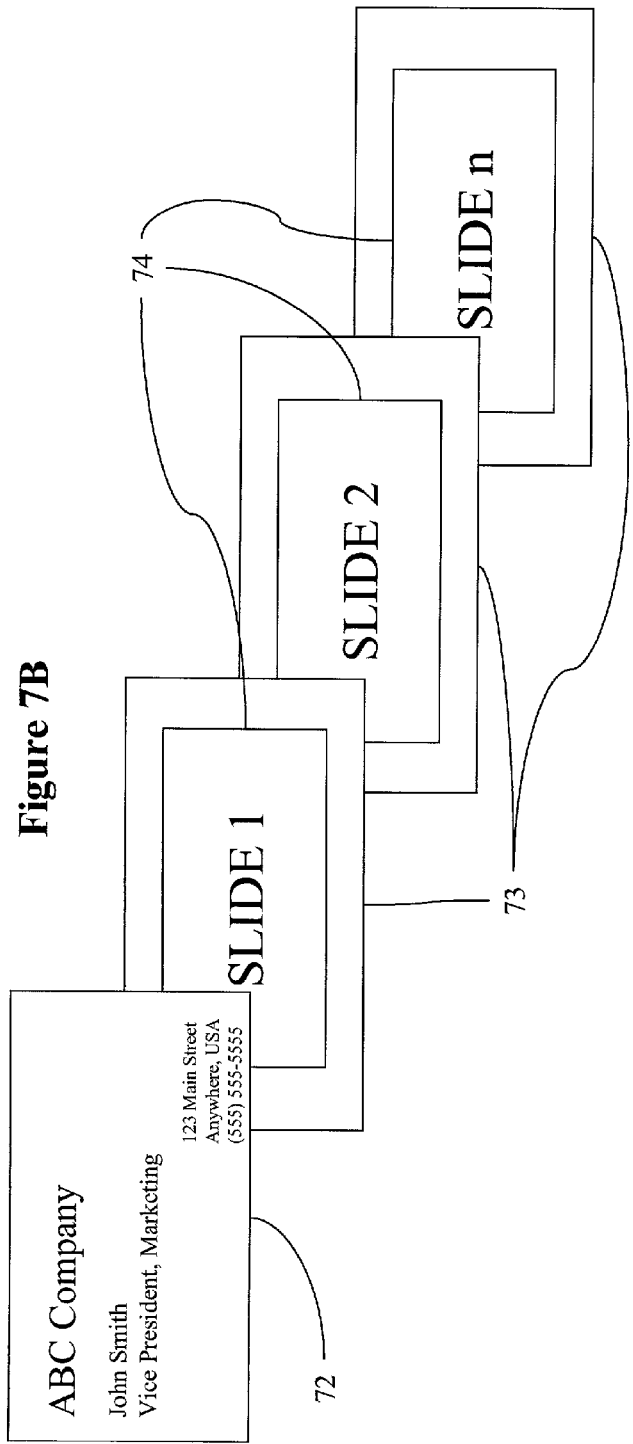
Figure 7C:
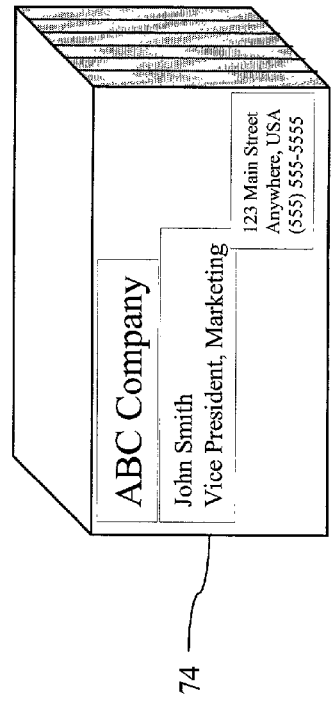

FIGS. 7A–7D illustrate another approach to creating a miniature printed version of presentation briefing materials. In this example, a multiple page handout is created and presented to the audience of the live presentation. As shown in FIG. 7A, each slide 71 from the live presentation may be reproduced in miniature onto individual miniature printed pages 70. In another embodiment of the present invention, only a subset of the individual slides 71 from the live presentation may be reproduced onto the individual pages 70 of the miniature printed presentation. As shown in FIG. 7C, the individual slides 74 from the live presentation, may be reproduced onto individual pages 73 that are of the same size as a standard business card 72. This deck of miniature presentation materials may be packaged along with a standard business card 72 into a single multi-page product 74 that can be given to each of the members of the audience of the live presentation.

In one embodiment, the deck of miniature presentation materials, whether the size of a standard business card or otherwise sized, is bound along one edge like a book. In a preferable bound embodiment, the binding will allow the miniature presentation to remain flat on a surface (e.g., a desk) when opened. As an example, a miniature presentation taking the form of a deck the size of a standard business card, as shown in FIG. 7C, is bound along the left hand side with a standard binding glue as is commonly used for binding books. By binding the miniature presentation as a deck of presentation materials, or book, the order of the presentation materials will be maintained, and the intended format of the miniature presentation will be preserved.

Figure 7D:
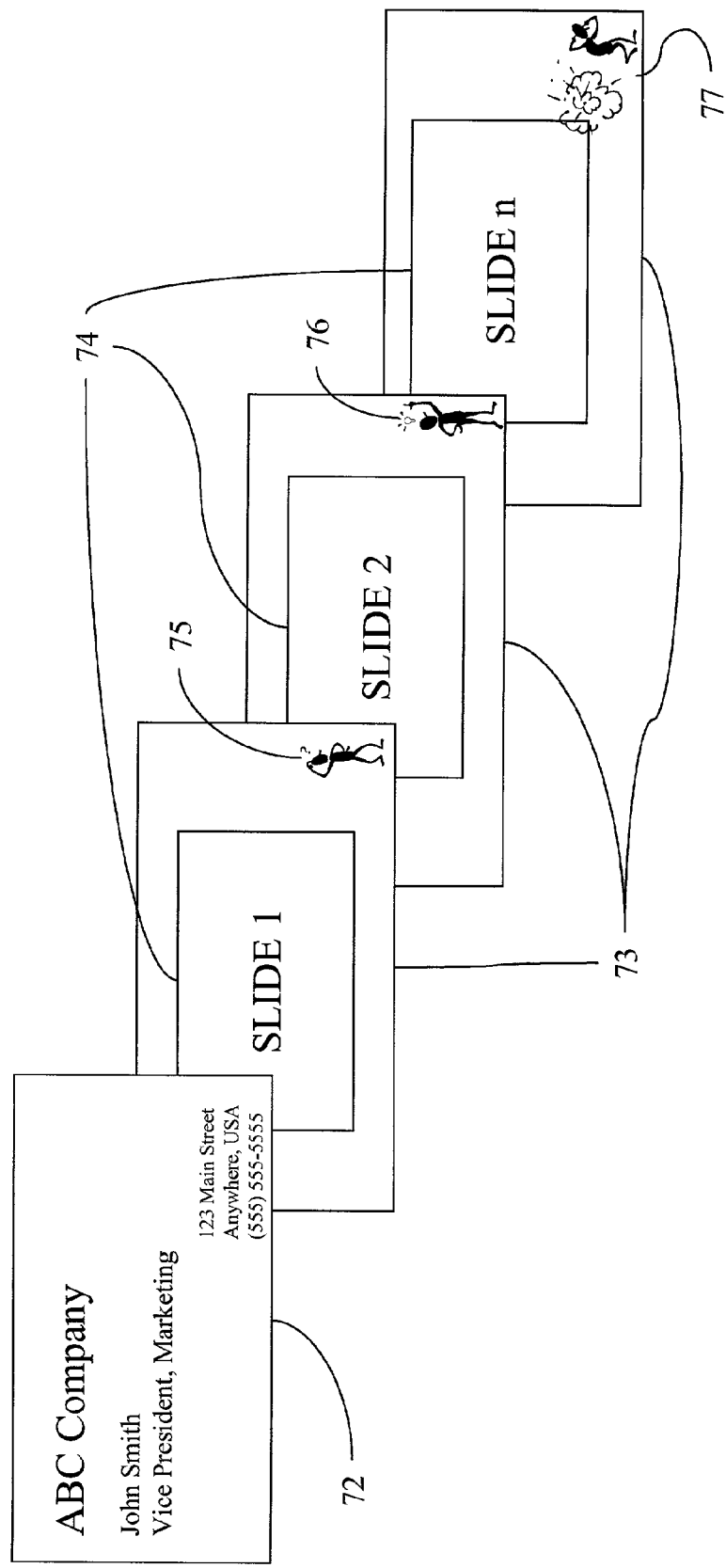

One approach that can facilitate re-looks, is to package the presentation materials as a fun giveaway than is less likely to be thrown away by the audience members. As shown in FIG. 7D, the miniature printed version of the presentation materials may be bound as a deck 74 on a size of paper that would help distinguish the product from conventional presentation handouts. AS shown in FIGS. 7B–7D, the multiple page miniature presentation materials may be bound as a deck of pages having the same size as a standard business card 72. To further enhance the likelihood that the handout will not be thrown away by the audience members, the individual pages 73 of the handout may each have a miniature representation of the slide 74 from the live presentation, as well as individual frames 75–77 of a multiple frame animation. The animation may be played by flipping through the deck and thereby giving the individual frames 75–77 animation. By packaging the animation with the marketing product, the likelihood that the product will be retained has been enhanced. It is foreseeable that the audience members would even give the presentation handout to their children or coworkers which would improve the likelihood that the message from the live presentation would gain further exposure.

Figure 8A:
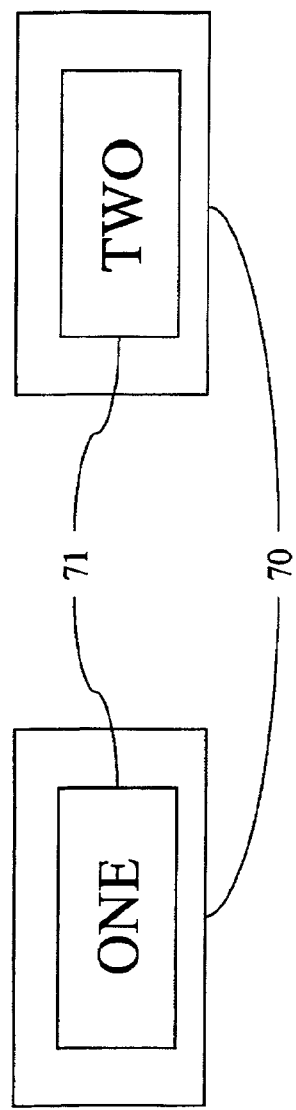
FIGS. 8A–8B are views of an exemplary multi-page bilingual miniature presentation.
Figure 8B:
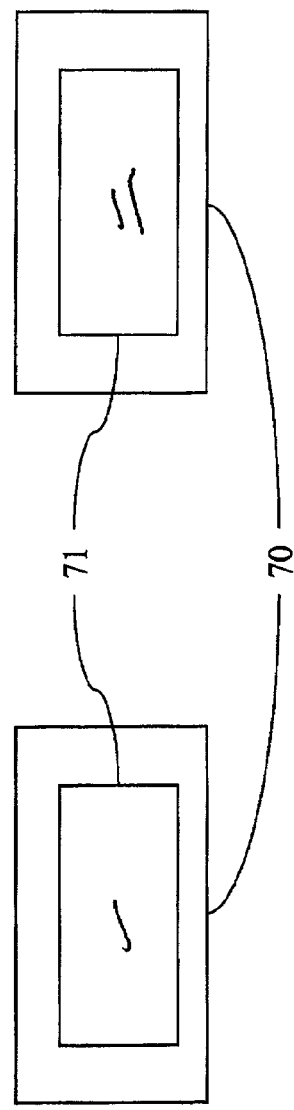

As discussed above, in the context of FIGS. 6A and 6B, another way of increasing the exposure of the message from the live presentation, is to produce a miniature printed version of the presentation materials in bilingual format. As shown in FIGS. 8A and 8B, a multiple page miniature printed version of the presentation materials may also be created in a bilingual format. As shown in FIG. 8A two individual pages 70 of a multiple page miniature presentation may each include a miniature rendition of an individual slide 71 from the presentation in a first language (e.g., English). As shown in FIG. 8B, on the reverse side of each page 70 of the multiple page miniature presentation, the individual slides 71 from the live presentation may be reproduced in another language (e.g., Japanese).

When designing a miniature presentation, it is not necessary that all of the details of slide appear on the miniature printed version of the presentation. For example, a title of a slide may be "Changes to Implement 18 Month Publication," but a corresponding slide in the miniature printed version of the presentation materials may simply appear as "18 Mo. Publication," as specified by the miniature presentation designer. Similarly, the miniature presentation designer may decide to only put headings on the miniature version, not the sub-headings that were included on the slides presented at the live presentation.

Figure 9A:
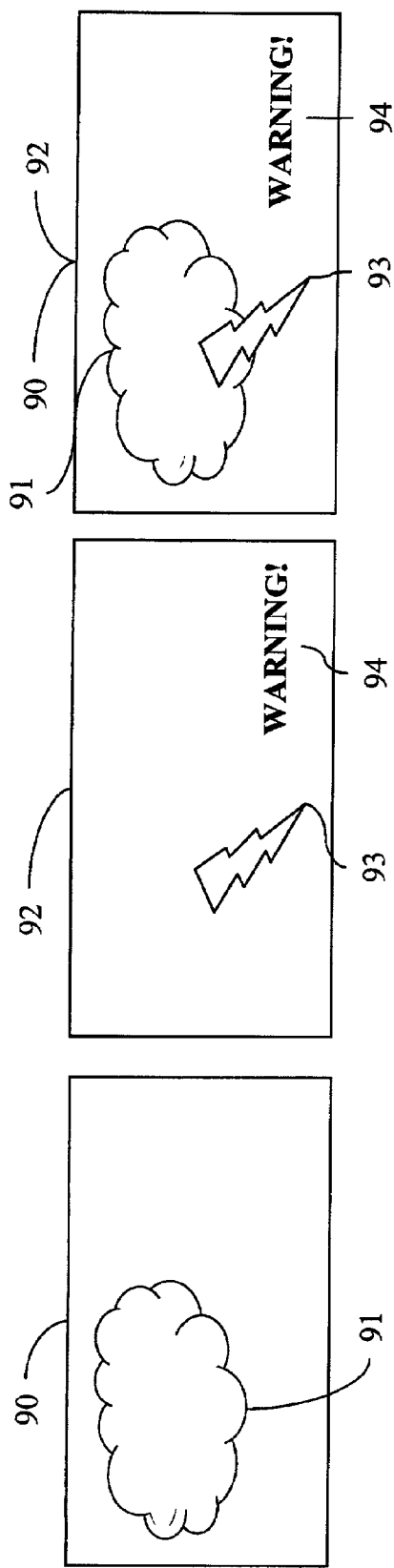

FIGS. 9A–9D illustrate the use of transparent slides included in the miniature printed version of the presentation briefing materials to provide emphasis within the miniature presentation. In this example, a lightning bolt 93 is provided on a transparent slide 92 of the miniature presentation that is overlaid on top of a cloud 91 appearing on an adjacent page 90 of the miniature presentation to provide emphasis. FIG. 9A shows an example slide from a miniature presentation 90 including an image of a cloud 91 as part of the message being presented on that particular slide. In this example, the next page of the miniature presentation includes a transparent slide 92 that contains images and text, that when placed on top of the previous slide 90, will provide emphasis to the message conveyed by that slide 90. The transparent slide 92 in this example, includes a lightning bolt 93 and corresponding text 94. As shown in the third panel of FIG. 9A, when the transparent slide 92 is laid on top of the presentation slide 90, emphasis can be given to the message contained in the original slide 90.

Figure 9B:
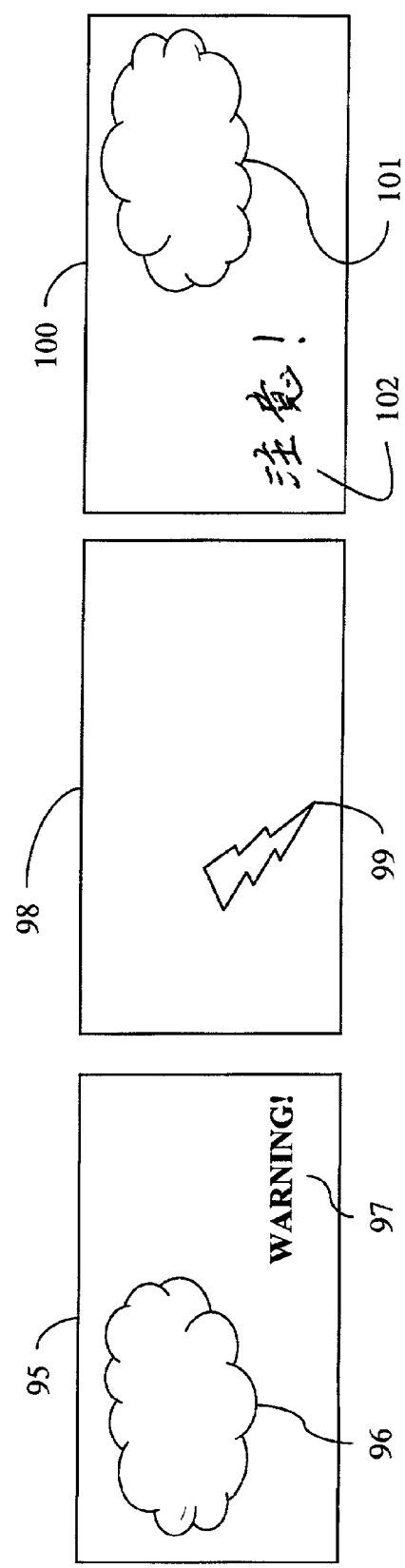

FIG. 9B illustrates the use of a transparency to provide emphasis in a bilingual miniature presentation. As shown in FIG. 9B, the bilingual information may be bound as mirror images, so that a transparent page between the mirror images, may be used to provide emphasis to both versions of that slide. For example, an English version slide 95 might contain a graphic image of a cloud 96 as well as English text 97 corresponding to that of FIG. 9A. A Japanese version of that same slide 100 is produced as a mirror image of the English version of the slide 95. For example, the graphic image of the cloud 101 is presented on the right hand of the slide, rather than the left hand side, as in the English version of the slide 95. Also, the Japanese version of the text message 102 is presented on the left hand side of the slide, rather than the right hand side of the slide, as in the English version of the slide 95. By producing the message as mirror images in the English version of the slide 95 and the Japanese version of the slide 100, a single transparency 98 containing a point of emphasis, such as a lightning bolt 99, may be used to overlay both versions of the slide. By ordering the pages of the miniature presentation so that the English version of the slide 95 appears first, followed by the transparency 98, and followed thereafter by the Japanese mirror-image version of the slide 100, the transparency 98 can be applied to either version of the slide.

FIGS. 9C and 9D illustrate the use of a single transparency 98 to provide emphasis to both versions of the bilingual presentation slides 95, 100. FIG. 9C shows the transparency 98 overlaying the Japanese version of the presentation slide 100, whereas FIG. 9D shows the same transparency 98 overlaying the English version of the presentation slide 95.

Figure 10A:
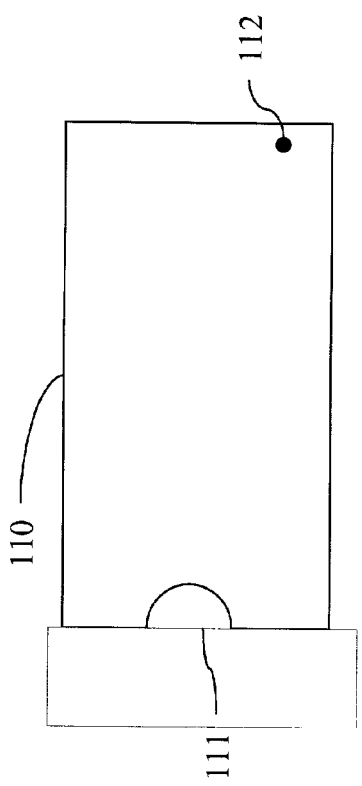
FIGS. 10A–10B are views of exemplary sleeves for protecting a miniature presentation.
Figure 10B:
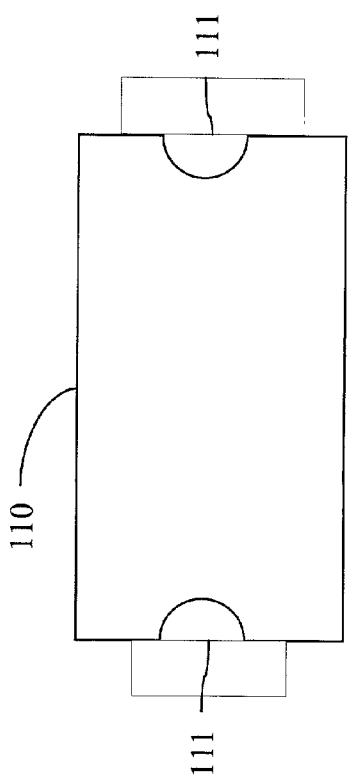

FIGS. 10A and 10B show exemplary sleeves that can be used to protect a miniature presentation. As shown in FIG. 10A, a sleeve 110 that has the form of an envelope may be used for protecting a miniature presentation. In one embodiment, the sleeve 110 includes a thumb hole 111 that will allow for the miniature presentation to be easily removed from the sleeve 110. Also, in this embodiment, an air hole 112 is provided to facilitate a flow of air when removing the miniature presentation from the sleeve 110 preventing a vacuum effect.

FIG. 10B shows another embodiment of a sleeve for protecting a miniature presentation. In this embodiment, the sleeve 110 is open on both ends, and includes two thumb holes 111 so that the miniature presentation may be removed from the sleeve 110 from either side. Providing a sleeve 110 for the miniature presentation will improve the longevity of the miniature presentation, which will, as discussed above, facilitate re-looks over a prolonged period of time. Furthermore, in one embodiment, the use of a protective sleeve 110 will enable the use of very thin paper for the miniature presentation itself by providing a thicker protective cover. In another embodiment, the protective sleeve is made of very thin paper or transparent plastic so that the miniature presentation may be viewed through the sleeve.

The processes set forth in the present description may be implemented using a conventional general purpose microprocessor program according to the teachings of the present specification, as will be appreciated by those skilled in the relevant arts. Appropriate software coding can be readily prepared by skilled programmers based on the teachings of the present disclosure, as will also be apparent to those skilled in the relevant arts.

The present invention thus also includes a computer based product which may be hosted on a storage medium and include instructions that can be used to program a computer to perform a process in accordance with the present invention. The storage medium can include, but is not limited to, any type of disk including floppy disk, optical disks, CD ROMs, magneto-optical disks, ROMs, RAMs, EPROMs, EEPROMS, flash-memory, magnetic or optical cards or any type of media suitable for storing electronic instructions.

Figure 11:
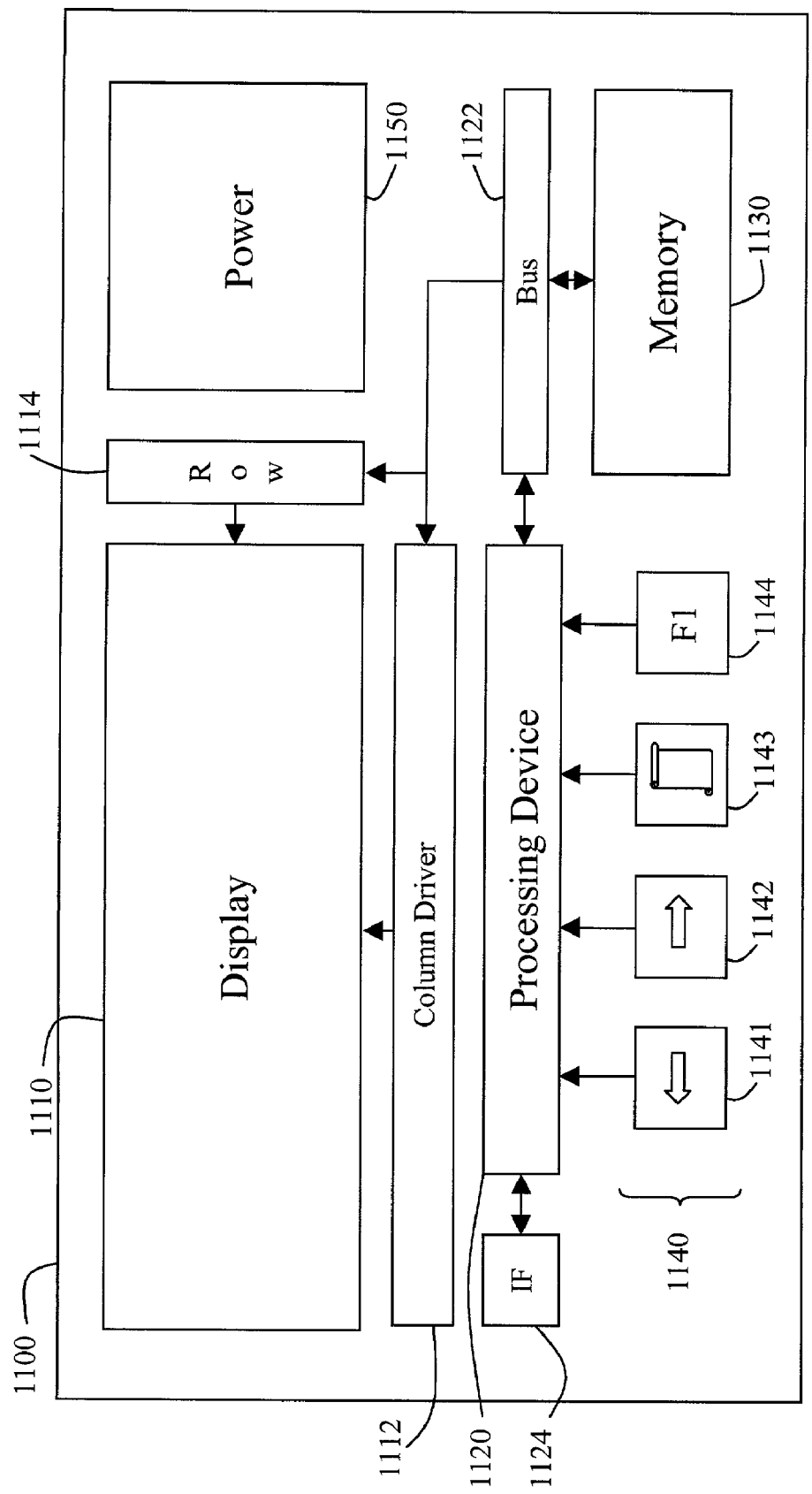
FIG. 11 is a block diagram schematically illustrating various portions of an electronic business card according to a preferred embodiment of the present invention.

FIG. 11 illustrates an exemplary embodiment of an electronic business card according to the present invention. The electronic business card 1100 preferably includes a display 1110, a processor element 1120, a memory 1130, various input devices 1140, and a power source 1150. It is understood that FIG. 11 is schematic in nature and is not a strictly pictorial representation, in that processing element 1120 and memory 1130 are embedded within the electronic business card, whereas the display 1110 and input devices 1140 are visible to the user. The electronic business card may be the same size as a standard business card (about 2 by 3.5 inches; about 50 by 88 mm) but may be of any size designed to elicit interest from a target audience.

The electronic business card 1100 preferably includes business identification and contact or promotional information printed thereon. Such information is printed in the same manner as a conventional business card, so that illustration thereof is not deemed necessary.

A presentation, such as a MICROSOFT POWERPOINT presentation, is stored in memory 1130, which is preferably a non-volatile memory that draws minimal power when activated. Memory 1130 may be any suitable memory, such as a read only memory (ROM), a write once read only memory (WOROM), an erasable programmable read only memory (EPROM), and the like.

Memory 1130 may be programmed at the time of manufacture, or, preferably, may be mass produced without content and later programmed by downloading particular presentations. To allow presentations to be downloaded and programmed into memory 1130, processing element 1120 is provided with a bus 1122 and an interface element 1124.

Interface 1124 may be any suitable interface, such as a conventional smart card contact grid or a wireless (contactless) interface. Implementations using contactless grids allow the advantage of simultaneous, parallel programming of large numbers of cards because a single transmitter can broadcast content to a large number of cards. The software interface for the data download may be implemented, for example, in accordance with ISO7816, a serial communications standard for smart cards.

Through interface 1124, processing element 1120 receives the content to be downloaded, and programs it into memory 1130 via bus 1122. In preferred embodiments, memory 1130 is erasable and re-programmable, thus allowing the same physical card to be used for successive presentations.

Processing element 1120 allows the presentation stored in memory 1130 to be displayed on display 1110. Element 1120 is understood to include not only processing circuitry per se, but also the programming necessary to carry out the processing. Accordingly, element 1120 may include a program memory that, for purposes of clarity in the drawing figure, is not specifically illustrated in FIG. 11.

To facilitate this display of the contents of memory 1130 on display 1110, bus 1122 allows data to flow among the processing element 1120, memory 1130, and display 1110. Of course, other architectures may be employed without departing from the scope of the invention.

Processing element 1120 receives as inputs, signals from respective buttons 1141, 1142, 1143, 1144. Buttons 1142 and 1141 are illustrated as "FORWARD" and "BACK" keys that cause a next and a preceding slide in a presentation, respectively, to be displayed. Button 1143 causes an index of slides to be displayed, allowing a viewer to choose a presentation's slide out of order, so as to view it more quickly than by successively pressing either FORWARD or BACK keys 1142, 1141.

Additional input devices, exemplified by "function" (F1) key 1144, may be provided that enable other functions to be performed. These additional input devices enhance the functionality and flexibility of the electronic business card, such as by toggling the business card display among two or more languages. It is envisioned that such flexible functionality can also be programmed into the "software" (in the form of "index" button), in addition to being programmed into "hardware" (in the form of additional input devices such as element 1144).

Input devices in array 1140 may be implemented as pressure-sensitive buttons, or solar cells that are activated by a person's finger covering them, or resistance-sensitive elements whose resistance changes as a function of pressure or heat, or with other technologies. Of course, the particular implementation of the input devices may vary while still remaining within the scope of the invention.

Display 1110 is preferably made of a thin, flexible, light-weight material that draws minimal electric current and that is rewritable a large number (preferably thousands) of times. In a particular embodiment, display 1110 is "electronic paper" that is made by a collaboration of XEROX Palo Alto Research Center (PARC) and Minnesota Mining and Manufacturing (3M). This electronic paper uses "gyricon" display technology developed by XEROX.

XEROX describes the gyricon sheet as a thin layer of transparent plastic in which a large number of small beads are contained in a large number of respective oil-filled cavities. The beads are bichromal (two-colored), and are free to rotate within their respective cavities. The beads are charged so that when a given voltage is applied to a cavity, the corresponding bead rotates to present a given colored side to the viewer of the electronic paper.

It is envisioned that the beads may be polychromal so that gray tone or color presentations may be displayed, in addition to the black-and-white presentations enabled by bichromal beads.

Advantageously, when implemented as the "electronic paper" described above, display 1110 consumes power only during the phase when picture elements are being shifted. Once positioned, the beads remain oriented in the same direction so that the image is preserved until different voltages are applied to each given picture element.

In the particular embodiment illustrated in FIG. 11, an array of elements addressed by a column driver 1112 and a row driver 1114 are controlled by processing element 1120 so as to cause an image or sequence of images from the presentation to be shown on display 1110. Programming of processing element 1120 allows the presentation slides to be displayed in a manner that is convenient to the user. For example, button 1144 may cause a sequence of slides to be automatically displayed at timed intervals, perhaps to create a 'motion picture' effect, without repeated user intervention.

According to a preferred embodiment, presentation slides may be interspersed with images that are of interest to the target user (a "hook"), so that the target user is enticed to view the entire display sequence including both presentation slides and the hook. Additional images, called "reward" images, are presented in interactive embodiments in which user inputs meet one or more success criteria such as answering a quiz question correctly or successfully playing a game. In this manner, the user is induced to repeatedly view the message (such a promotional material) programmed into memory 1130 that the presenter desires his target audience to see and remember.

Processing element 1120 may be any suitable microprocessor element or logic device. In a particular preferred embodiment, a very low power complex programmable logic device (CPLD), such as a XILINX CoolRunner™ device, is employed. Such CPLDs have the advantage that they draw virtually no current in standby mode, and use very little power even during dynamic operation.

Figure 12:
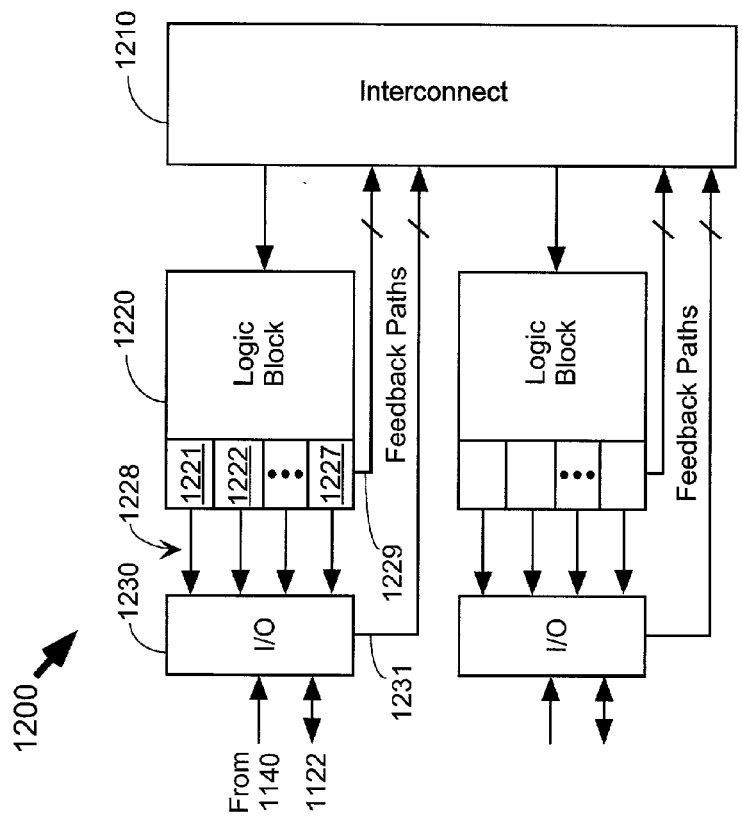
FIG. 12 is a block diagram of a complex programmable logic device (CPLD) that may constitute a portion of the electronic business card of FIG. 11.

FIG. 12 is a block diagram of an exemplary complex programmable logic device (CPLD) 1200 that may be used in implementing processing element 1120 (from FIG. 11). An interconnect element 1210 provides outputs to various logic blocks 1220, two of which are shown for illustrative purposes. Logic blocks 1220 may include, for example, programmable logic arrays (PLAs) and/or programmable array logic (PAL) elements such as those described with reference to FIGS. 13A and 13B.

Connected to outputs of each logic block 1220 are plural macrocells (MCs) 1221 through 1227. Macrocells provide basic combinatorial and/or sequential logic as needed for a particular application, and as such need not be detailed herein. The macrocells provide respective outputs 1228 to I/O devices 1230 as well as feedback outputs 1229 to interconnect element 1210. I/O blocks 1230 connect to bus 1122 and input device array 1140 (FIG. 11), as well as providing feedback outputs 1231 to interconnect 1210.

Figure 13A:
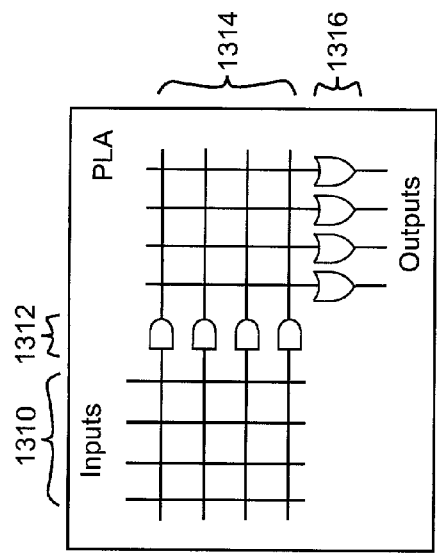
FIGS. 13A and 13B illustrate, respectively, a programmable logic array (PLA) and a programmable array logic (PAL) that may be included in the logic blocks of FIG. 12.
Figure 13B:
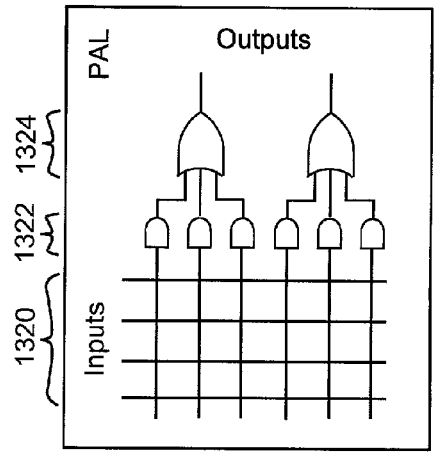

A CPLD may include an interconnected set of simple programmable logic devices (SPLDs) such as PLAs (generalized in FIG. 13A) and/or PALs (generalized in FIG. 13B).

In the PLA of the schematic diagram of FIG. 13A (from Cline, Signetics, 1975), a first array 1310 includes rows and columns of input lines whose intersections may be fused together to create connections that perform the logical AND function. Performance of this AND function is schematically illustrated by horizontal lines from array 1310 being respectively input to a set of AND gates 1312. Outputs of AND gates 1312 form horizontal lines in a second array 1314. Vertical lines in array 1314 may be programmably fused to the horizontal lines to perform a logical OR function, schematically illustrated connection to respective OR gates 1316.

In the PAL of the schematic diagram of FIG. 13B (from Birkner, MMI, 1978), a single array 1320 of input lines that may be selectively fused together is provided. Horizontal lines from array 1320 perform a logical AND function, illustrated by being provided to respective AND gates 1322. The outputs of the several AND gates 1322 are provided to a smaller number of OR gates 1324. In this manner, the PAL provides an output that is a logical sum of a number of logical products of the input signals.

Of course, processing elements 1120 may be implemented in ways other than those specifically described herein. For example, it is further envisioned that processing element 1120 (FIG. 11) may be implemented as reprogrammable arrays, such as generic array logic (GAL) elements, as well as other elements that may be suitable to a particular application.

Advantages of the electronic business card 1100 include low power consumption of its elements, so that power source 1150 may be implemented as a solar cell.

Further, the novelty interest of the electronic business card may be enhanced by using a power source that is interesting to the target audience. For example, a piezoelectric power source may be used. The piezoelectric power source is activated when a user bends the electronic business card so as to induce electric current in an embedded piezoelectric element, which current charges a capacitor that powers the other elements in the card. Alternatively, two electrically complementary metal electrodes on an edge of the card can be inserted into a citrus fruit or the like, so as to cause an electrochemical reaction to generate electric current to power the electronic business card's elements.

The small size and functionality of the electronic business card ensure that it will remain of interest to the user, encouraging repeated use of the electronic business card to review the presentation stored in it. Moreover, the novelty interest of the electronic business card makes it likely that the user will show the electronic business card to other individuals, thereby propagating the message contained in the presentation.

Figure 14:
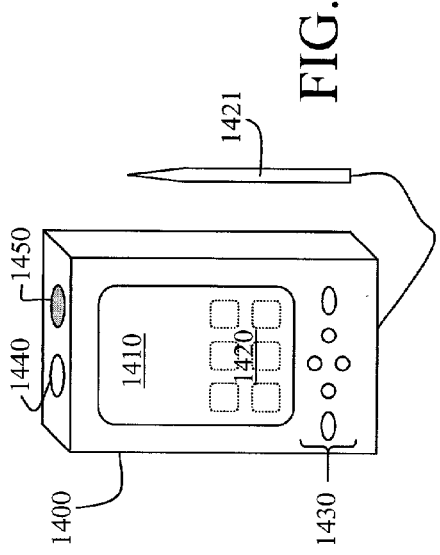
FIG. 14 illustrates an exemplary personal digital assistant (PDA) that may be used in accordance with a further embodiment of the present invention.

FIG. 14 illustrates an exemplary personal digital assistant (PDA) useful in implementing still another method according to the present invention. The PDA includes a display 1410 that may include a writing area or "soft" buttons 1420. Also, "hard" buttons 1430 may also be provided. A stylus 1421 may be used to press the "soft" buttons in area 1420 of the display, or to write symbols that may be recognized by the optical character recognition (OCR) software resident in the PDA. Further, the PDA is provided with an infrared (IR) port 1440 that allows communication of presentation materials between the PDA and a personal computer (PC) or another PDA. Alternatively, a hard-wire connection socket 1450 is provided to communicate the presentation data to another device such as a PC or additional PDA.

Figure 15:
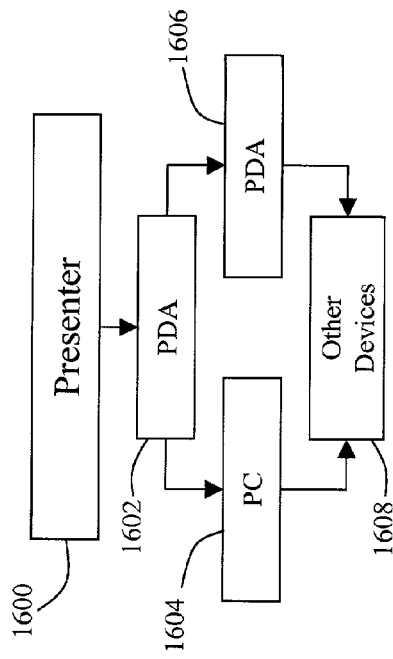
FIG. 15 is a flowchart illustrating how a presentation may be intermingled with other items designed to be of interest to the viewer, so that the viewer must see the presentation in order to see the items of interest.

FIG. 15 is a flowchart showing how a PDA or electronic business card may be programmed so as to entice a user to view a presentation even if that is not the user's original or main intent.

Control enters the FIG. 15 flowchart on path 1500. First block 1510 is a composite block that includes a "payload" 1511 and a "hook" 1512.

Generally, a payload 1511 includes the presentation materials or promotional materials that the presenter has caused to be programmed into the PDA or electronic business card and which the presenter considers important to reach the target audience.

A "hook" 1512 is any step, program, image, sound, or other item that is designed to raise the target audience's interest and attention, and thereby encourage individuals to continue to use the device and therefore view the presentation material. For example, the hook may be a game that has a goals and rewards, or a series of quiz questions that have particular correct answers. The payload material 1511 may be presented before, contemporaneous with, integrally with, and/or after, hook 1512.

Preferably, the presentation material is incorporated in a program that is interactive, so that the user enters a user response. Block 1520 indicates the program's input and analysis of the user's response.

In decision block 1530, when the target audience member correctly answers a quiz question or reaches an intermediate goal or landmark in a game, control passes to block 1540. Block 1540 indicates the presentation of a reward 1542 to the user, optionally in association with additional payload material 1541. After the reward is presented to the user, control returns to block 1510.

However, if the individual does not correctly answer the quiz question or achieve an intermediate goal in a game, control reverts to block 1510 where the same or different payload material 1511 may be presented with the same or a different hook item 1512.

In the foregoing manner, individuals who have attended a presentation are enticed to repeatedly review the content of a presentation, and to spread the content of the presentation to other individuals.

Figure 16:
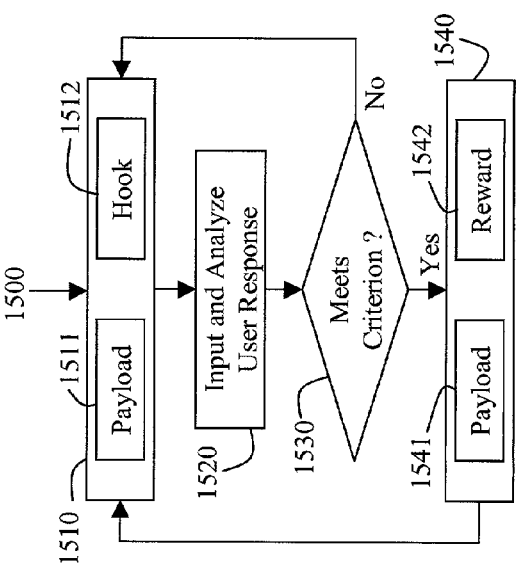
FIG. 16 illustrates propagation of presentation material from a presenter to various devices such as personal digital assistants (PDAs) and personal computers (PCs).

Referring to FIG. 16, in the particular embodiment in which a PDA is used, the presentation may be downloaded in an executable presentation program from the presenter 1600 to an audience member's PDA 1602, for later viewing on the PDA. Thereafter, the audience member, who hopefully finds the presentation material to be of interest due to the quiz or game accompanying it, sends the presentation and other material to a personal computer 1604 or to a PDA 1606 of other individuals via infrared port 1440 or PC port

1450. From such additional PCs 1604 or PDAs 1606, the presentation may be further propagated to still more devices 1608 such as PDAs or PCs.

In this manner, the information or promotional material that the presenter desires to spread to as large an audience as possible, is actually propagated by the members of his original audience to a much larger audience.

Various inventive methods having been described above, the invention also encompasses apparatus (especially programmable computers and hand-held devices) for carrying out the methods. Further, the invention encompasses articles of manufacture, specifically, computer readable memory on which the computer-readable code embodying the methods may be stored, so that, when the code used in conjunction with a computer or other device, the computer or device can carry out the methods.

Non-limiting, illustrative articles of manufacture (storage media with executable code) may include the magnetic disks, optical disks, conventional 3.5-inch, 1.44 MB "floppy" diskettes or other magnetic diskettes, magnetic tapes, optical disks, flash memories, and the like. Each constitutes a computer readable memory that can be used to direct the computer or other device to function in a particular manner when used by the computer or device.

Those skilled in the art, given the preceding description of the inventive method, are readily capable of using knowledge of hardware, of operating systems and software platforms, of programming languages, and of storage media, to make and use apparatus of the invention, as well as computer readable memory articles of manufacture which, when used in conjunction with a computer can carry out the inventive methods. Thus, the invention's scope includes not only the methods themselves, but also apparatus and articles of manufacture.

Numerous modifications and variations of the present inventions are possible in light of the above teachings. It is therefore to be understood that, within the scope of the appended claims, the inventions may be practiced otherwise than as specifically described herein.

The invention claimed is:

1. An electronic business card configured to display at least one image to a user, the electronic business card comprising:
   a storage device configured to store the at least one image;
   a display device configured to display the at least one image; and
   a processing device configured to read the at least one image from the storage device and to display the at least one image on the display device,
   wherein the display device includes:
   a plurality of picture elements containing respective multi-chromic beads whose physical orientation is controlled by the processing device so as to collectively form the at least one image.

2. The electronic business card of claim 1, wherein the display device further includes:
   a matrix of plural cells respectively containing the multi-chromic beads.

3. The electronic business card of claim 2, wherein the plural cells further contain:
   a fluid that supports the multi-chromic beads so as to help retain respective physical orientations of the beads so that the multi-chromic beads continue to display the at least one image without further application of power.

4. The electronic business card of claim 1, further comprising:
   a row decoder and a column decoder, responsive to the processing device and configured to address individual picture elements and selectively control the physical orientation of respective multi-chromic beads as the picture elements in accordance with the at least one image from the storage device.

* * * * *